United States Patent [19]
Dürr et al.

[11] Patent Number: 5,690,741
[45] Date of Patent: Nov. 25, 1997

[54] ARRANGEMENT FOR IMPREGNATING WEBS OF POROUS MATERIAL

[75] Inventors: Wolfram Dürr, Krefeld; Ernst Klas, Siegburg; Udo Unger, Leichlingen, all of Germany

[73] Assignee: Vits Maschinenbau GmbH, Langenfeld, Germany

[21] Appl. No.: 619,756

[22] PCT Filed: Jul. 31, 1995

[86] PCT No.: PCT/EP95/03029

§ 371 Date: Mar. 27, 1996

§ 102(e) Date: Mar. 27, 1996

[87] PCT Pub. No.: WO96/06227

PCT Pub. Date: Feb. 29, 1996

[30] Foreign Application Priority Data

Aug. 24, 1994 [DE] Germany .................. 44 29 939.7
Feb. 7, 1995 [DE] Germany .................. 295 01 918.2

[51] Int. Cl.⁶ .................................................. B05C 3/00
[52] U.S. Cl. ........................... 118/404; 118/405; 118/407; 118/419; 118/429
[58] Field of Search ................................ 118/404, 405, 118/407, 419, 429

[56] References Cited

U.S. PATENT DOCUMENTS 4,740,391  4/1988  Long ............................. 118/419

FOREIGN PATENT DOCUMENTS 0173519  4/1989  European Pat. Off. .

OTHER PUBLICATIONS

DE–Z Coating 9/10, pp. 336 to 341 Hugo Klein (1990).

*Primary Examiner*—Laura Edwards
*Attorney, Agent, or Firm*—Michael J. Striker

[57] ABSTRACT

In known pressure impregnating devices there is a chamber, which continuously narrows in the transport direction, between a cylinder around which the web to be impregnated loops, and the inner wall of a trough containing the impregnating agent. The impregnating agent is supplied to the chamber under high pressure, which is further increased in the chamber by dynamic effects. Sealing problems arise at the inlet and outlet slits as well as at the front faces because of the high pressure. Disruptions in the operation can be created by fluff coming loose from the paper web as well as by impregnating agent penetrating between the sliding faces. The new device is intended to remedy these disadvantages, and is provided with the seals have alternating narrow gaps and wide grooves in the form of a labyrinth seal. The grooves are have drain openings for the impregnating agent flowing through.

9 Claims, 5 Drawing Sheets

ARRANGEMENT FOR IMPREGNATING WEBS OF POROUS MATERIAL

BACKGROUND OF THE INVENTION

The invention relates to a device for impregnating webs of porous materials.

It is known from EP 0 173 519 B1, on which the invention is based, to perform the impregnation under increased pressure. By means of this it is possible to place a considerably larger amount of impregnating materials into the substrate than with pressureless impregnation. For example, it becomes possible to impregnate denser paper of small absorption capability. Furthermore, the possibility arises of using impregnating agents of high viscosity, i.e. with an increased solid content and a reduced solvent portion. The required pressure increase is achieved in particular in that the chamber receiving the impregnating agent continuously narrows from the inlet slit in the direction toward the outlet slit. The web passing through pushes the boundary layer adhering to its surface into the narrowed area of the chamber. Because of this the pressure in the chamber continuously increases in the direction toward the outlet slit. In accordance with the information in the said reference, with passage speeds of approximately 45 or 60 m/s, pressures, which lie clearly above 1 MPa, are achieved in the vicinity of the outlet slit. If the impregnating agent is supplied by means of a pressure pump, the static pressure generated by the pressure pump is added to the dynamic pressure generated in the chamber.

With the known pressure impregnating device, sealing of the chamber is connected with considerable problems. Sealing lips are disposed at the inlet slit and the outlet slit which are pressed against the passing web and on the edge zones of the cylinder surface not covered by the web. It has been shown that fluff is separated from the passing web by the sealing lips, collects at the outlet slit and causes interference, which can collect at the outlet slit and can cause interference.

A ring-shaped hollow chamber is located at the front faces of the cylinder between the cylinder surface and the cylinder journal. An annular piston, connected fixed against relative rotation, is seated therein and can slide in the axial direction. The annular piston, which is made of bronze, can be pressed with its end faces tightly against the front faces of the trough by supplying compressed air. Lubricating oil can be supplied through bores to an annular grove disposed in the end face of the annular piston. This seal is very complicated and expensive. In addition it has the disadvantage that impregnating agents can penetrate between the sliding surfaces and glue them shut.

With the known device the cylinder surface is provided over its entire length with thread-like arranged grooves. The grooves are intended to receive liquid impregnating agent which has been pressed through the pores of the material web and to return it into the trough. Air which had been displaced out of the pores by the impregnating agent can also escape through the grooves.

If the width of the web to be impregnated is less than the cylinder length, lateral areas of the cylinders remain uncovered. The result is that impregnating agent flows out through the grooves at the inlet slit and particularly at the outlet slit.

The theme of a publication in DE-Z COATING 9/10, pp. 336 to 341, is the metered application of flowable substances to passing webs with the aid of matrix cylinders. Various matrix shapes are recited, among them in particular those, wherein the cylinder surface is provided with regularly arranged small depressions, identified as "small cups", which for example have the shape of pointed or truncated pyramids and are separated from each other by narrow strips. Application devices are described wherein the matrix cylinder dips into a trough, containing the substance to be applied, with a portion of its circumference. In the process the small cups are filled and the substance is picked up in this way by the rotating matrix cylinder. Excess substance is doctored off, so that the matrix cylinder always carries along the same amount of material. The substance is transferred to the web, which is conducted along outside of the trough. The transfer takes place either by direct contact between the matrix cylinder and the web or indirectly by means on an interposed application cylinder.

SUMMARY OF THE INVENTION

It is the object of the invention to create a device for impregnating webs of porous materials with an improved sealing system.

In keeping with these objects and with others which will become apparent hereinafter, one feature of the present invention resides, briefly stated, in a device for impregnating webs made of a porous material, in which seals which are applied at the inlet slit, at the outlet slit, and between the end faces of the cylinder and the inner surfaces at the front end of the trough have alternatingly narrow gaps and wide grooves to form labyrinth seals, and the grooves are provided with drain openings for an impregnating agent flowing through.

When the device is designed in accordance with the present invention, it has an improved sealing.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
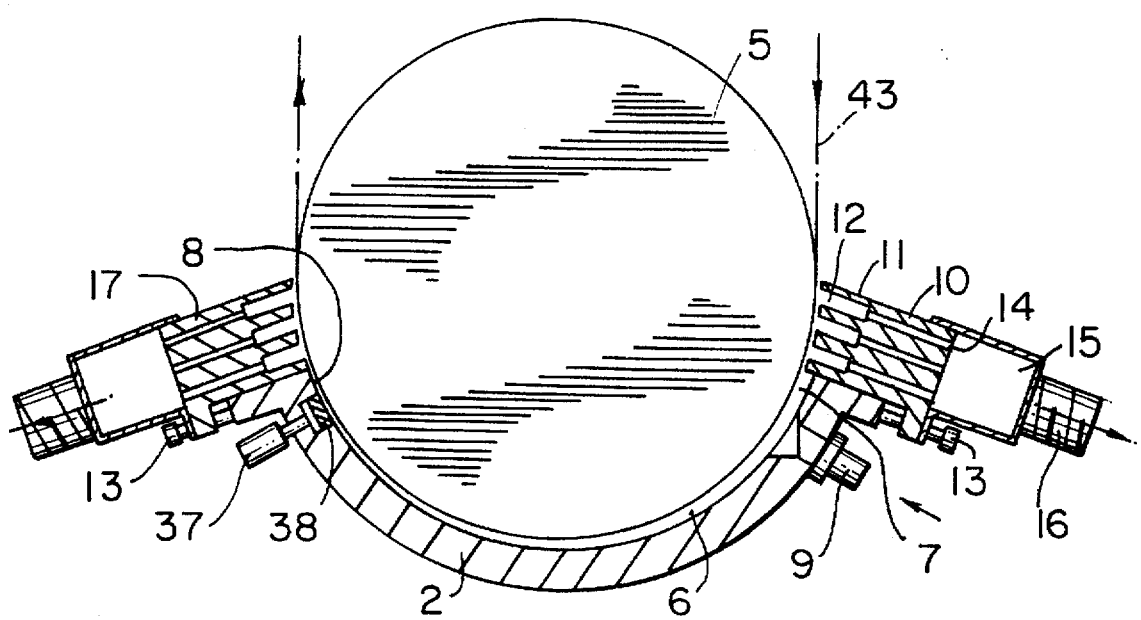
FIG. 1 shows a cross section of the first exemplary embodiment.
Figure 2:
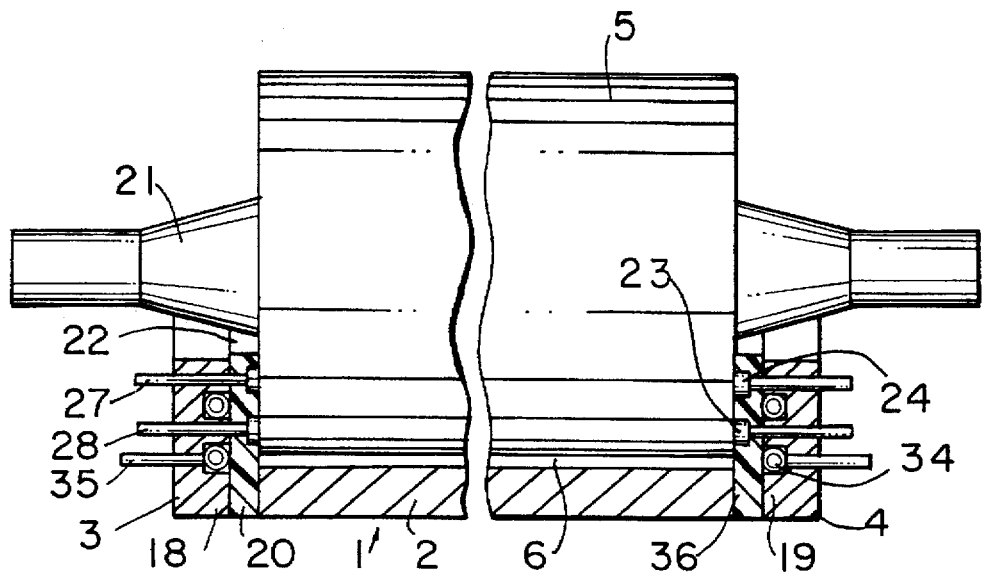
FIG. 2 shows a longitudinal section.
Figure 3:
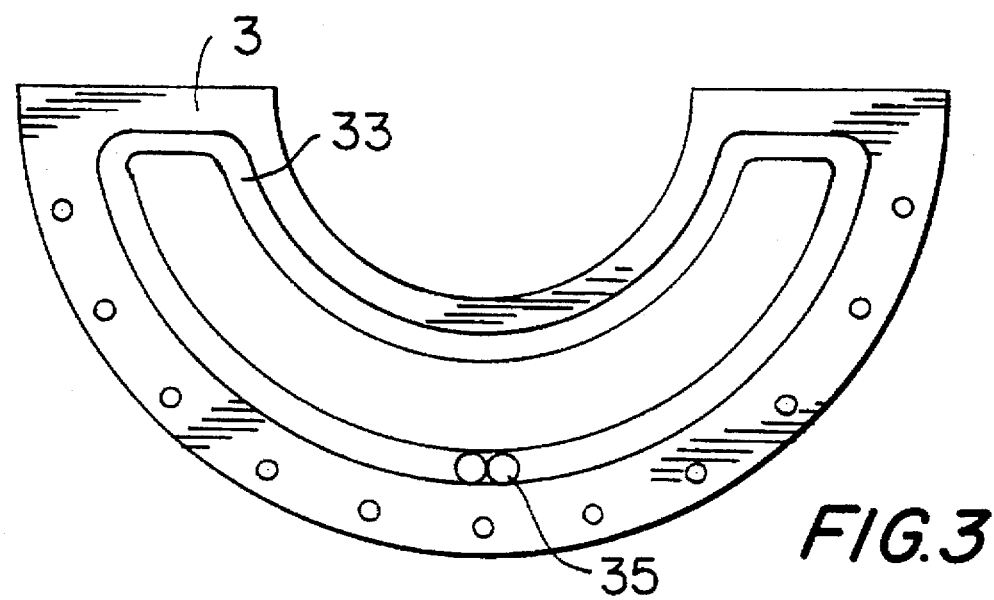
FIG. 3 shows the inside of a front wall.
Figure 4:
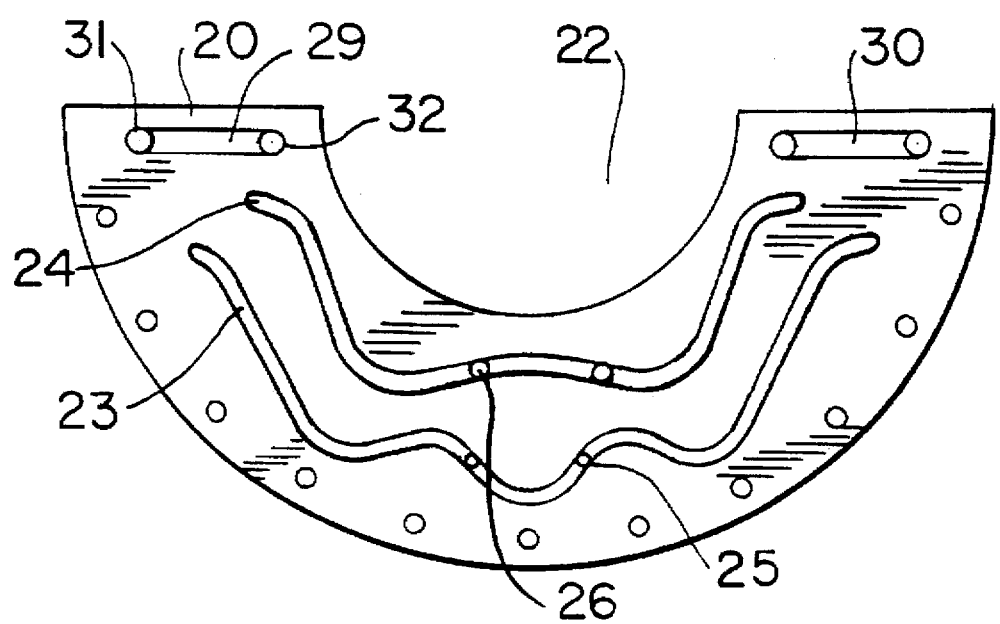
FIG. 4 shows the inside of a sealing plate.

A cylinder 5, rotatably seated in an upper frame, not shown, which can be raised and lowered, is provided with a drive unit, also not shown, and partially dips into a trough 1, which essentially consists of a base body 2 and flat front faces 3, 4. The base body 2 has an arc-shaped cross section and approximately forms a semi-cylinder. A chamber 6 is located between the concave inner surface of the base body 2 and the surface of the cylinder 5, whose width, measured in the radial direction, continuously decreases from an inlet slit 7 in the direction toward an outlet slit 8, so that at the outlet slit 8 it is hardly greater than the thickness of a paper web to be coated. This is described in detail in the already mentioned EP 0 173 519 B1, to which reference is made here.

A supply line 9 for an impregnating agent terminates in the chamber 6 in the vicinity of the inlet slit 7. The supply line 9 passes through the base body 2 and is connected with a pressure pump, not shown.

A sealing block 10 extending from the front face 3 to the front face 4 is disposed at the inlet slit 7. Alternating strips 11 and grooves 12 are disposed on the side facing the cylinder 5, so that the cross section shown in FIG. 1 approximately resembles a comb. The broken line, which illustrates the outer surfaces of the strips in cross section, is adapted to the the cylinder cross section, so that narrow gaps exist between the outer surfaces of the strips 11 and the surface of the cylinder 5. The width of the gaps can be changed by means of an approximately radial fine adjustment, shown as a screw 13 in FIG. 1. Each groove 12 is provided with a plurality of outflow openings 14 distributed over the length, which penetrate the sealing block 10 and terminate in a conduit 15 from which a drain pipe 16 extends. A corresponding sealing block 17 is attached at the outlet slit 8.

The front faces 3, 4 are connected by means of screws 18, 19 with the base body 2. A sealing plate 20 is clamped between the front face 3 and the base body 2. It is approximately semi-circular and has a recess 22 in the area of the cylinder journal 21. It is made of a flexible, wear-resistant plastic material, which has a low coefficient of friction in respect to metal. The sealing plate 20 is provided with grooves 23, 24 which essentially extend over the width and have a curved, approximately wave-like course. The grooves 23, 24 have drain openings 25, 26, from which drain pipes 27, 28 extend and are conducted to the exterior through the front face 3. Short, approximately horizontal grooves 29, 30 are applied on both sides of the recess 22. Each one of these is provided with an inflow opening 31 and an outflow opening 32 for a cleaning fluid.

The lateral wall 3 has a circular groove 33 which runs along its edges at an approximately constant distance. An elastically expandable hose 34 lies in the groove 33. It can be connected by means of a supply line 35 with a pressure line, not shown. The front wall 3 is embodied mirror-reversed in respect to the front wall 4 and a sealing plate 36 with the corresponding connections is embodied mirror-reversed in respect to the sealing plate 20.

Figure 5:
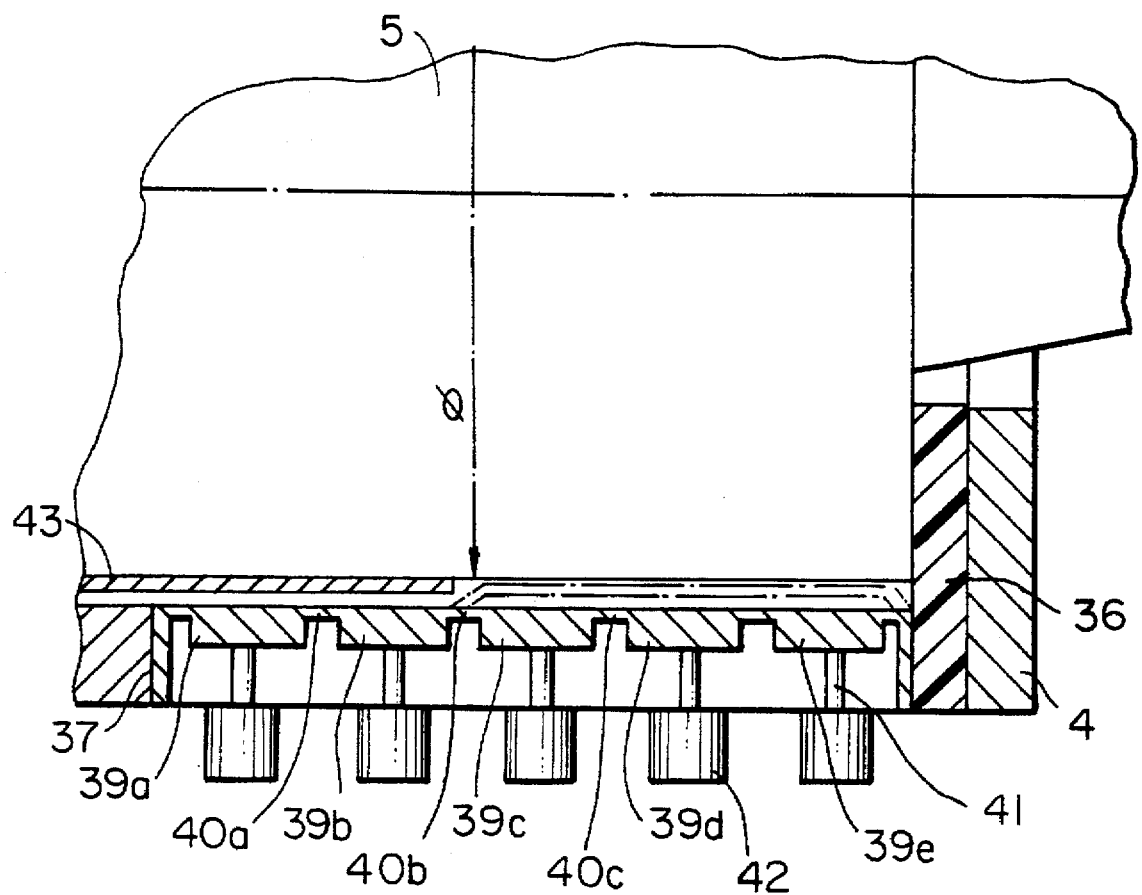
FIG. 5 illustrates a throttle member.

In accordance with FIG. 5, in which the front wall 4 with the associated sealing plate 36 is shown in a simplified manner, additional throttle members 37 are provided in the edge zone adjoining the front wall 4 at both the inlet slit 7 as well as the outlet slit 8. The same applies to the opposite side, not visible in FIG. 5. As can be seen in FIG. 1, such a throttle member is located in a longitudinal groove 38 which has been milled into the inner face of the base body 2 at a short distance below the sealing block 17 and extends from the edge over approximately a quarter of the total length. It is made of a bending-resistant profiled plastic section and is divided lengthwise into several sections 39a, 39b, etc. The cross section of the profiled plastic section is weakened between the individual sections, so that the intermediate sections 40a, 40b, etc. are flexible and almost act as hinges. A piston rod 41, which penetrates through the base body 2, acts on each section 39a, 39b, etc. It can be adjusted in small increments radially in the direction toward the cylinder 5 by means of a hydraulic cylinder 42.

In operation, a paper web 43 to be impregnated, which loops around the cylinder 5 over approximately one-half of the circumference, is introduced into the chamber 6 through the inlet slit 7. The impregnated web leaves the chamber 6 through the outlet slit 8. Impregnating agent is supplied to the chamber 6 via the supply line 9, preferably at an increased pressure of 0.2 to 1.0 MPa, for example. Because of the restriction, a pressure gradient is created in the chamber 6 by the dragging effect of the web being moved through it, so that the pressure in the vicinity of the outlet slit 8 is considerably higher than the pressure under which the impregnating agent is supplied.

Narrow gaps are set at the sealing blocks 10, 17 between the outer faces of the strips 11 and the paper web 43 lying on the cylinder 5 by means of the screw 13, so that the strips 11 do not touch the web 43 to be impregnated and the cylinder 5. A small stream of the impregnating agent continuously leaves the chamber 6 through the gap between those strips 11 which immediately adjoin the inlet slit 7 or the outlet slit 8, reaches the adjoining groove 12 and flows under almost no pressure through the bores 14 into the collecting conduit 15 and from there through the drain pipe 16 to a collecting reservoir, not shown, for example to the receptacle of the pump which pushes impregnating agent into the supply line 9. Very small amounts of impregnating agent at most flow through the gaps of the further strips 11 and run off through the corresponding grooves 12, if required. The amount exiting at the sealing block 17 at the outlet may be slightly greater than at the inlet side. On the one hand, this is caused by the increased pressure at the outlet slit 8 and, on the other hand, because the dragging force exerted on the exiting liquid by the rotating cylinder 5 is directed into the chamber 6, but at the outlet slit 8 to the outside.

If the width of the passing paper web is less than the length of the cylinder 5, an edge zone on each side of the cylinder 5 remains uncovered. In the example illustrated in FIG. 5, the uncovered edge zone approximately corresponds to the area in which the sections 39c to 39e of the throttle member 37 are arranged. To prevent an undesirably heavy leakage flow of the impregnating agent exits through the relatively wide gap between the uncovered surface of the cylinder 5 and the outer surfaces of the strips 11, the sections 39c to 39e of the throttle member 37 are displaced forward in the direction toward the cylinder 5 with the aid of the associated hydraulic cylinders 42. The forward displacement approximately corresponds to the thickness of the paper web 43. The sections 39a, 39b remain inactive and in their base position, in which their surface facing the cylinder 5 is located approximately flush with the inner surface of the base body 2. The intermediate section 40b located in the edge area of the paper web 43 makes possible the required deformation of the throttle member 37, indicated by dashed lines in FIG. 5.

The hose 34 is charged via the supply line 35 with sufficient pressure so that a small flow of the impregnating agent exiting the chamber 6 is maintained between the sealing plate 20 and the end face of the cylinder 5. The leaking liquid is used as a lubricant between the cylinder 5 and the sealing plate 20. Therefore the hose 34 only exerts a relatively weak force on the sealing plate 20. This force is not sufficient for pushing the sealing plate 20 tightly against the end face of the cylinder 5. Therefore gaps exist between the end face and the sealing plate 20, which are separated from each other by the grooves 23, 24. They are kept so small by the pressure force that the leaking flow of the impregnating agent does not exceed a preset amount. The equivalent applies to the sealing plate 36.

For cleaning, a liquid is supplied to the grooves 29, 30 while the cylinder rotates. The liquid is distributed over the end faces of the cylinder 5, in the course of which it also partially gets into the grooves 23, 24. It can drain via the outflow opening 32 as well as via the drain openings 25, 26.

Figure 6:
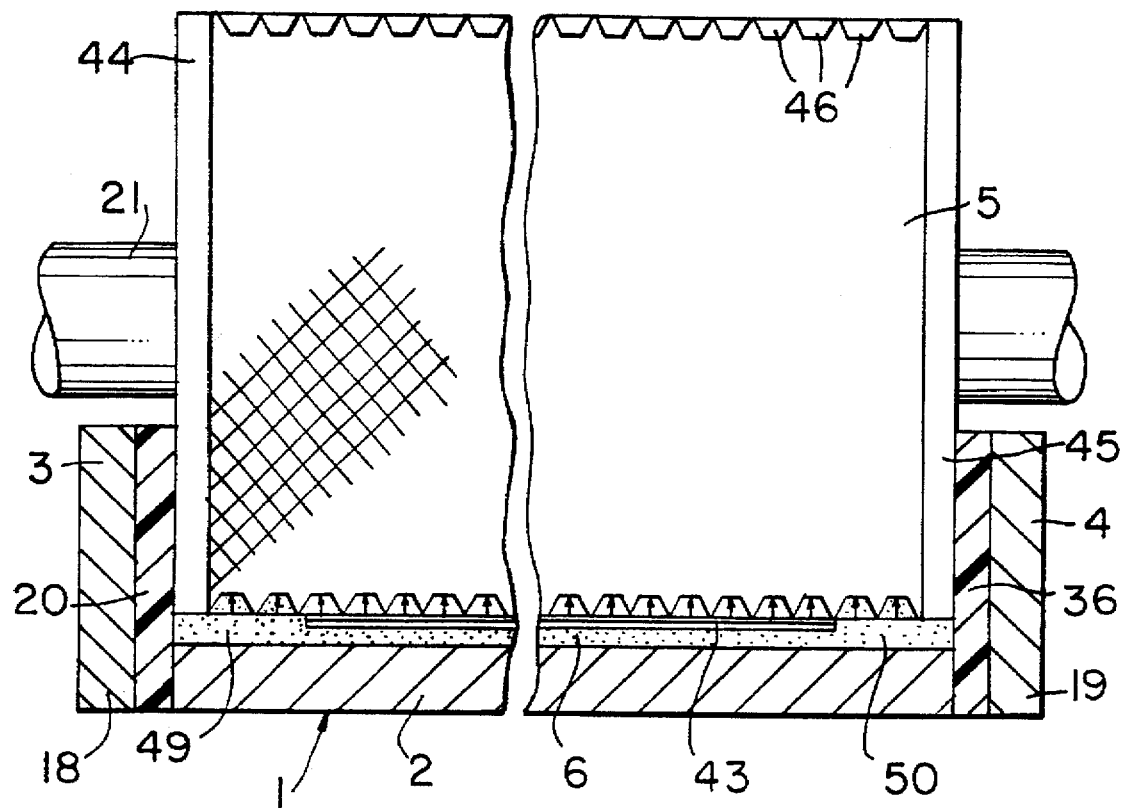
FIG. 6 shows a longitudinal section, simplified for another exemplary embodiment.
Figure 7:
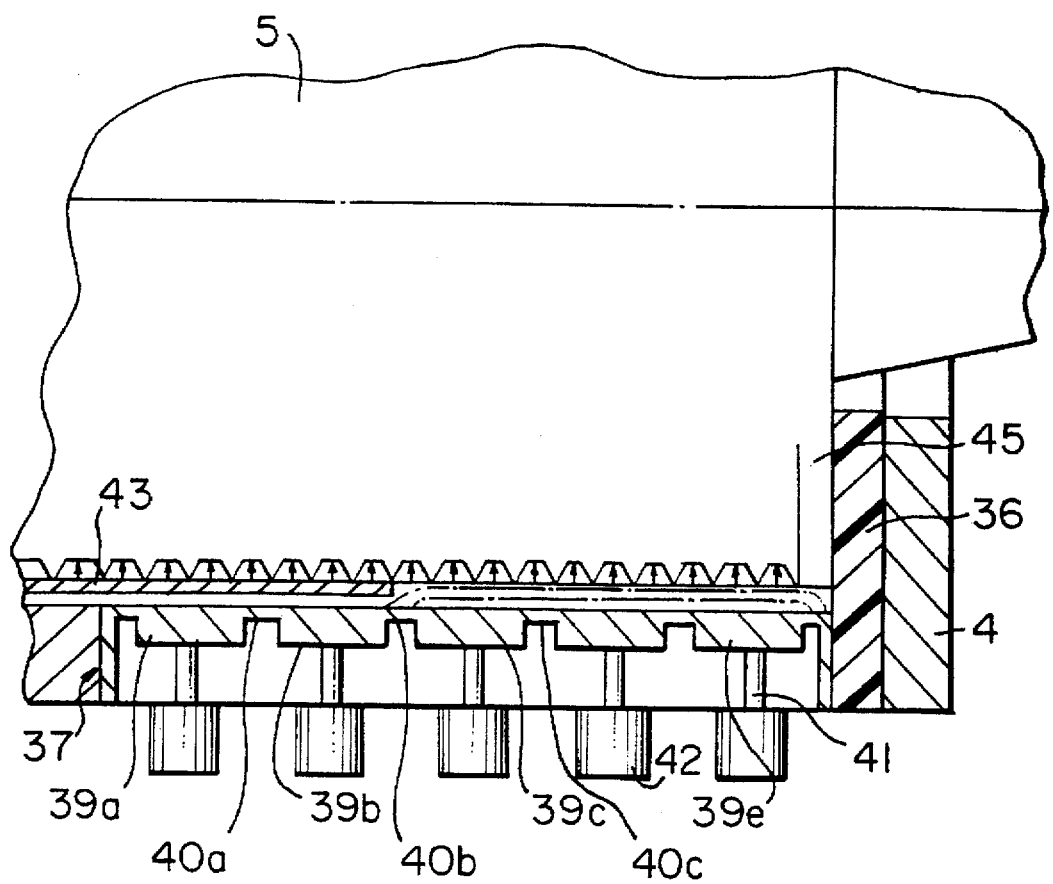
FIG. 7 shows the other exemplary embodiment with a throttle member in accordance with FIG. 5.
Figure 8:
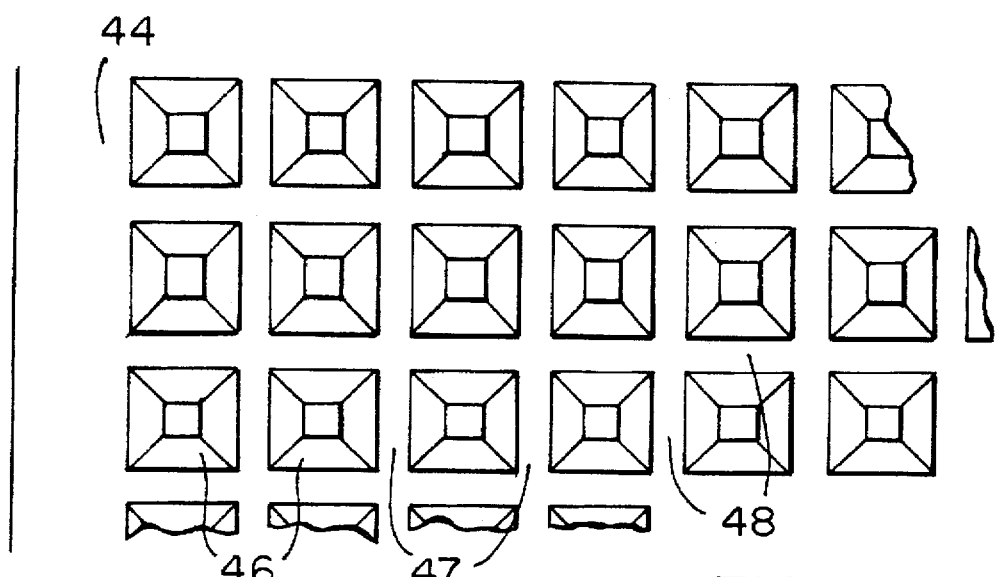
FIG. 8 shows a portion of a developed view of the surface of the cylinder in connection with the other exemplary embodiment.

The preferred exemplary embodiment represented in FIGS. 6 to 8 essentially differs from the exemplary embodiment described up to now in that the surface of the cylinder 5, with the exception of narrow edge strips 44, 45, is provided with regularly disposed small cups 46, which have the approximate shape of a truncated pyramid with a square base. The lateral length of the base surface preferably lies between approximately 0.3 and 1.5 mm, the depth between approximately 0.3 to 1 mm. The small cups 46 are separated from each other by narrow strips 47, 48. The exterior faces of the strips 47, 48 are located in the cylindrical enveloping surface defined by the smooth exterior face of the edge strips 44, 45. The strips 47 extend in the circumferential direction, the strips 48 are located parallel with the axis of the cylinder 5. It is also possible to arrange the strips 47, 48 diagonally.

In the case illustrated in FIG. 6 and FIG. 7, the width of the passing paper web 43 is less than the length of the cylinder 5. The small cups 46 are only covered in the area covered by the paper web 43. The impregnating agent is pushed under pressure into the paper web 43. The air is displaced out of the pores and escapes into the small cups 46. Impregnating agent which was possibly pushed through the paper web 43 also reaches the small cups 46. The small cups 46 in the lateral areas 49, 50, which were not covered by the paper web 43, are filled with impregnating agent. The strips 48 which are parallel with the axis of the cylinder 5 form a system of blocks in these areas which—in comparison with the prior art described at the outset—considerably hampers the exit of impregnating agent. Together with the strips 47 extending in the circumferential direction they form a supporting network for the paper web 43, Otherwise the mode of functioning corresponds to the previously described exemplary embodiment.

We claim:

1. A device for impregnating webs composed of a porous material with a liquid impregnating agent under increased pressure, the device comprising, a cylinder rotatable around a horizontal axis and having end faces; a trough into which said cylinder partially dips so as to form a chamber between an inner surface of said trough and an outer surface of said cylinder, said trough having front faces with inner surfaces, a supply line for supplying the impregnating agent and terminating in said chamber; an inlet slit and an outlet slit for supplying and withdrawing a web to be impregnated; and sealing means for sealing said inlet slit, said outlet slit and a space between said end faces of said cylinder and said inner surfaces of said front ends of said trough, said sealing means having alternatingly arranged gaps and grooves to form a labyrinth seal, said grooves being provided with drain openings for flowing through of the impregnating agent.

2. A device as defined in claim 1, wherein said sealing means include an inlet sealing block provided in a region of said inlet slit and an outlet sealing block provided in a region of said outlet slit, each of said sealing blocks being fastened to said trough and being displaceable in a direction which is substantially radial in respect to said cylinder.

3. A device as defined in claim 1, wherein said sealing means include sealing plates located between said end faces of said cylinder and said front faces of said trough.

4. A device as defined in claim 3, wherein said trough includes a base body having an arc-shaped cross section and flat front walls connected with said base body, said sealing plate being clamped between said base body and said front faces, said front faces being provided with grooves which receive elastically expandable hoses connectable to a pressure line.

5. A device as defined in claim 4; and further comprising screws which connect said base body with said front walls of said trough.

6. A device as defined in claim 4; and further comprising connecting pipes which connect said elastically expandable hoses to the pressure line.

7. A device as defined in claim 2; and further comprising throttle members each composed of individual sections and extending parallel to said sealing block in the regions of said inlet slit and said outlet slit; and adjusting members acting on each of said throttle members so as to separately adjust said individual sections of each of said throttle members.

8. A device as defined in claim 7, wherein said throttle member is composed of a profiled plastic element which is subdivided into said individual sections including main sections separated from one another by intermediate sections with a weakened cross section, said profiled plastic element being bendable as a hinge between said sections.

9. A device as defined in claim 1, wherein said outer surface of said cylinder is provided with a plurality of depressions which are formed as small cups located closely to one another and separated from one another by strips.

* * * * *